(12) United States Patent
Malenfant et al.

(10) Patent No.: US 6,886,588 B2
(45) Date of Patent: May 3, 2005

(54) BUOYANCY FLUSHING APPARATUS AND METHOD THEREOF

(76) Inventors: Marc-André Malenfant, 159, Chemin du Club des 10, St-Modeste Québec (CA), G0L 3W0; Yves Bérubé, 303, Chemin du Lac, Notre-Dame-du-Portage Québec (CA), G0L 1Y0; Nicolas Viel, 11, St-Dominique, Rivière-du-Loup Québec (CA), G5R 2P3; Roger Lacasse, 133, Côte de la Mer, Notre-Dame-du-Portage Québec (CA), G0L 1Y0; Jean-Pierre Dautais, 2, Allée des Touzelles, Basse Goulaine (FR), 44115

( * ) Notice: Subject to any disclaimer, the term of this patent is extended or adjusted under 35 U.S.C. 154(b) by 0 days.

(21) Appl. No.: 10/664,198

(22) Filed: Sep. 17, 2003

(65) Prior Publication Data

US 2004/0111794 A1 Jun. 17, 2004

(30) Foreign Application Priority Data

Sep. 17, 2002 (CA) .............................. 2403610

(51) Int. Cl.⁷ .......................... F16K 31/20; F16K 31/22; F16K 33/00
(52) U.S. Cl. ......................... 137/399; 137/2; 137/15.26; 137/397; 137/398; 137/423; 137/430; 137/433; 405/36
(58) Field of Search .................... 137/2, 15.26, 397, 137/398, 399, 423, 429, 430, 433, 577, 578, 579; 210/109, 121, 123; 405/36

(56) References Cited

U.S. PATENT DOCUMENTS 548,685 A * 10/1895 White ......................... 137/397
602,525 A * 4/1898 Scott .......................... 137/433

(Continued)

FOREIGN PATENT DOCUMENTS

CA 2121994 10/1995
FR 523.281 3/1919

(Continued)

OTHER PUBLICATIONS

Tuf–Tite, 6–Hole Distribution Box, publicity, 1998, Tuf–Tite Corporation.
Polylok's Dipper Box, publicity on Internet, www.polylok.com/dipper, 1997.

(Continued)

*Primary Examiner*—George L. Walton
(74) *Attorney, Agent, or Firm*—St. Onge Steward Johnston & Reens LLC (57) ABSTRACT

A buoyancy flushing apparatus is disclosed which comprises a reservoir for accumulating liquid, having an inlet for receiving liquid and an outlet chamber recessed in a bottom wall of the reservoir. The outlet chamber includes an outlet for draining liquid out of the reservoir. The apparatus further comprises an outlet valve movable between a down position where liquid accumulates in the reservoir and a raised position where liquid accumulated in the reservoir is flushed out via the outlet. The outlet valve comprises a ballast unit sized and shaped to fit loosely in the outlet chamber when said valve is in the down position; and a float unit topping the ballast unit to move the valve in the raised position by buoyancy when a sufficient amount of liquid is accumulated in the reservoir, thereby providing a passageway for liquid between the bottom wall of the reservoir and the valve leading to the outlet in the outlet chamber to flush liquid out of the reservoir. Guiding means are provided for guiding the outlet valve between the down position and the raised position. The apparatus can be used for applications such as water treatment and irrigation. It could advantageously be used for directing and spreading waste water previously treated in a septic tank to different sanitary treating fields.

15 Claims, 10 Drawing Sheets

U.S. PATENT DOCUMENTS

| | | | |
|---|---|---|---|
| 847,361 A * | 3/1907 | Palmer et al. | 137/423 |
| 1,140,666 A * | 5/1915 | Cummings | 137/399 |
| 1,677,970 A * | 7/1928 | Janette | 137/398 |
| 1,897,313 A * | 2/1933 | Wilheim | 137/398 |
| 1,906,277 A * | 5/1933 | McGee | 137/433 |
| 2,904,062 A | 9/1959 | Techler | 137/391 |
| 3,126,907 A * | 3/1964 | Tischler et al. | 137/399 |
| 3,522,013 A * | 7/1970 | Borgeson | 137/397 |
| 4,535,800 A * | 8/1985 | Leech | 137/433 |
| 5,290,434 A | 3/1994 | Richard | 210/109 |
| 5,381,956 A * | 1/1995 | Robinson et al. | 137/397 |
| 6,112,766 A | 9/2000 | Zoeller et al. | 137/561 A |
| 6,152,650 A | 11/2000 | Heine | 405/36 |

FOREIGN PATENT DOCUMENTS

| | | |
|---|---|---|
| FR | 2592595 | 7/1987 |
| FR | 2654758 | 5/1991 |
| FR | 2654761 | 5/1991 |
| FR | 2654829 | 5/1991 |
| FR | 2760030 | 8/1998 |
| WO | WO 99/60221 | 11/1995 |
| WO | PCT/CA 03/01411 | 9/2003 |

OTHER PUBLICATIONS

Polylok's New Equalizer, publicity on Internet, www.polylok.com/eqizr, 1997.

The Floating Outlet Dosing Distribution Chamber, publicity, L.I.Z. Electric, Keeseville, N.Y., USA.

Séparateur de debit gravitaire Zabel, publicity, Premier Tech Environment, 1998.

Regard de répartition SL—RR 450, Sotralentz.

Assainissement autonome, information sheet.

Tru Flow, Distribution Box System, publicity, Onsite insight.

* cited by examiner

FIG. 10

BUOYANCY FLUSHING APPARATUS AND METHOD THEREOF

This application claims priority from pending Canadian Patent Application No. 2,403,610 filed on Sep. 17, 2002.

FIELD OF THE INVENTION

The present invention is concerned with a flushing apparatus and a method thereof. The present invention also relates to an apparatus for flushing and distributing predetermined and adjustable volumes of liquid towards one or several directions or surfaces to be used for applications such as water treatment and irrigation. It could advantageously be used for directing and spreading waste water previously treated in a septic tank, or other treatment units, to different sanitary treating fields.

BACKGROUND OF THE INVENTION

Already known in the prior art, there are the flushing or dosing systems involving a hydraulic event used for example in septic fields, or other systems such as irrigation systems. These systems use gravity powers to obtain a fast flow of water. Most often, these prior art flushing systems use a float body which floats up on the surface of the water as the tank fills. The float body is attached to a tank discharge pipe by a flexible coupling which allows the float to lift as the water level rises in the tank, preventing any water from flowing out of the tank. When the water level is high enough, it overflows into the float body, causing the float to loose buoyancy and sink to the bottom of the tank. This action opens a direct path for the water to flow out of the tank. The water in the float empties, allowing the float to regain buoyancy and float up off the bottom of the tank. Examples of such flushing systems are given in U.S. Pat. No. 5,290,434, FR 2,760,030 and FR 2,654,761.

More specifically, U.S. Pat. No. 5,290,434 describes an effluent dosing septic system which comprises a relatively water-tight walled structure capable of accumulating a volume of septic tank effluent; a disposal field dosing system having at least one outlet conduit having an outlet end and an inlet end; a stand pipe which extends from each of the outlet conduits towards the top of the structure; a float having a chamber having an opening on an upper surface thereof; at least one feed conduit having an inlet end located within the chamber and an outlet end in operative connection with the inlet end of the outlet conduit; and a jointed coupler which forms the operative connection between the feed conduit(s) and outlet conduits.

FR 2,760,030 describes a flushing system having a float with a horizontal outlet. The float is attached to an outlet tube. The system is supported by a double, hinged cradle, which rotates around a horizontal axis according to the water level. The position in which water begins to flow is determined by the balance between the thrust produced by the drainage pipe and the attached float and the total weight of the counterweight. The float is attached to a counterweight with one fixed section, which slides over a rod that ensures that the system returns to a height, cutting of the supply to the outlet pipe.

On its side, FR 2,654,761 describes a pendulous drainage device comprising at least one outlet pipe mounted movably between an upper position and a lower position, inside a tank supplied with a liquid, and communicating at its lower part with a discharge conduit situated outside the tank. This device is characterised in that the free end of the outlet pipe comprises a buoyancy unit consisting of an annular cell inside which the mouthpiece of the outlet pipe opens.

Also known in the art, there is FR 2,654,758, which describes a pendulum device for flushing and distributing a liquid. This device comprises at least one drain tube mounted so that it can move between a high position and a low position outside a tank fed by a liquid and communicating at its lower part with the inside of the tank through the use of a siphon. The tube is normally held in a high position inclined with respect to the vertical by means of a ballast. The effect of the ballast is cancelled out under the action of the weight of the liquid filling the tube as the level in the tank gradually rises.

Also known in the prior art, there is FR 2,592,595, which describes a liquid distributor with a hydraulic event involving the gravity energy. The device comprises a source of pressure and a plurality of so-called distribution members downstream of the source of pressure. Each of the distribution members is connected to the source of pressure by at least one discharge tube creating a pressure drop greater than any other pressure drop downstream of the discharge tube.

Among the drawbacks encountered with the above-mentioned documents, there are the followings. These systems do not provide a great flexibility in relation to the water level fluctuation range that is needed for operating the apparatus, and they do not provide a great flexibility for adjusting the mobility of the flushing arm.

Also known in the art, there are systems with siphon. Such systems have the drawback of being easily blocked when operated with wastewater. Furthermore, when these systems are operated with low flow rates, the siphon often does not trigger.

Also known in the art, there are the systems involving the use of pumps. Apart from the fact that these systems require a pump, which is per se a limiting factor, they also have the drawback that pumps consume energy and need maintenance.

Different liquid distribution systems also exist in the prior art for dividing a low flow of wastewater or effluent into equal quantities for distribution to separate discharge pipes in an absorption field. They are the simple T- or Y-shaped flow dividers commercialised under the trademark ZABEL® Z200 and that split the flow of water into two flows. Such divider has the drawback of being easily clogged when operated with wastewater. Another drawback with those flow dividers is that their distribution efficiency relies on an almost perfect levelling of the device, which levelling is almost impossible to maintain in practice because of the movement of the soil caused by its packing and the freezing of the soil.

Also known in the prior art, there are the distribution boxes described in U.S. Pat. No. 6,152,650 or in U.S. Pat. No. 6,112,766. Both these documents disclose a liquid distribution system for distributing effluent from a source of wastewater. The liquid distribution system is contained within a distribution box and includes liquid inlet piping, a ramp system, and a low capacity liquid flow splitting system, including slots and capillary grooves. A high capacity flow splitting system may also be included. In addition, an adjustment system is incorporated into the liquid distribution system for maintaining the level of the liquid distribution system in the ground. As for the above-mentioned flow dividers, one drawback with those distribution boxes is that their distribution efficiency relies on an almost perfect levelling of the box. Another drawback with those distribution boxes is that because there is no regular hydraulic event occurring as in the systems described above which use a float, clogging tends to rapidly occur within the structure.

Indeed, the hydraulic event helps preventing the biomass from growing onto the structure.

The flushing apparatus of the present invention is distinct from and overcomes several drawbacks of the prior art devices, as will be discussed in detail below.

SUMMARY OF THE INVENTION

An object of the present invention is to provide a flushing apparatus for liquid that overcomes several of the drawbacks mentioned above.

In accordance with the present invention, that object is achieved with a buoyancy flushing apparatus comprising a reservoir for accumulating liquid. The reservoir has an inlet for receiving liquid and an outlet chamber recessed in a bottom wall of the reservoir. The outlet chamber includes an outlet for draining liquid out of the reservoir. The apparatus further comprises an outlet valve movable between a down position, where liquid accumulates in the reservoir, and a raised position, where liquid accumulated in the reservoir is flushed out via the outlet. The outlet valve comprises a ballast unit sized and shaped to fit loosely in the outlet chamber when the valve is in the down position. The valve also comprises a float unit topping the ballast unit to move the valve in the raised position by buoyancy when a sufficient amount of liquid is accumulated in the reservoir, thereby providing a passageway for liquid between the bottom wall of the reservoir and the valve leading to the outlet in the outlet chamber to flush liquid out of the reservoir. A guiding means is provided for guiding the outlet valve between the down position and the raised position.

It is worth mentioning that the indefinite article "a" or "an" when used hereinabove and throughout the description is intended to mean "at least one". As for example, a flushing apparatus comprising more than one reservoir with more than one inlet or more than one outlet chamber is within the scope of the present invention.

As can be appreciated, one advantage of the present invention is that it provides a great flexibility with respect to the water level fluctuation range that is needed for operating the apparatus. In other words, the flushing apparatus has the advantage of not requiring an important variation of the water level in order to obtain a pressure head sufficient to create the required hydraulic event at the outlets of the apparatus. Indeed, the pressure head created by the water accumulated in the reservoir is more important than the variation of the water level necessary to create such pressure head. Therefore, in order to obtain an outflow comparable to the outflow obtained with a prior art buoyancy flushing apparatus of the type described, for example, in U.S. Pat. No. 5,290,434, the reservoir of the present invention does not have to be as deep as the tank described in that prior art U.S. patent.

The guiding means preferably comprises an upright rod with a lower end connected to a bottom wall of the outlet chamber, the valve being mounted on the rod in a slidable manner. The guiding means also preferably comprises:

a sleeve slidably mounted on the upright rod, the ballast unit being fixed to the sleeve, whereas the float unit is slidably mounted on the sleeve;

a high stop secured to the sleeve above the float unit for stopping an upward movement of the float unit when the float unit is caused to move upwards by buoyancy; and a seal secured to the sleeve on top of the ballast unit, the seal being sized to completely close the outlet chamber when the valve is in the down position;

whereby, when the liquid accumulating in the reservoir reaches a first level, the float unit moves upwards by buoyancy until it is stopped by the high stop leaving the ballast unit in the outlet chamber which is closed by the seal, then when the liquid continues to accumulate in the reservoir, an increasing upward pressure starts to exercise on the float unit and the high stop, thereby causing the seal to slightly lift off and allowing liquid to seep there under and causing the ballast unit to trigger off and move upwards to abut on the float unit, thereby opening widely the passageway to the outlet.

In accordance with a preferred aspect, the flushing apparatus comprises more than one of said outlets provided in the outlet chamber.

The present invention is also directed to a method for flushing a predetermined amount of liquid, comprising the steps of:

a) providing a flushing apparatus as defined above; and b) accumulating a sufficient amount of liquid in the reservoir to move the valve in the raised position and flush said amount of liquid out of the reservoir.

BRIEF DESCRIPTION OF THE DRAWINGS

These and other objects and advantages of the invention will become apparent upon reading the detailed description and upon referring to the drawings in which:

FIG. 3 is the same view as FIG. 2 showing the reservoir with an accumulation of water about to be sufficient to raise the outlet valve by buoyancy.

FIG. 4 is the same view as FIG. 2 showing the outlet valve in the raised and open position, thereby allowing the liquid accumulated in the reservoir to be flushed out via the passageway created between the valve and the bottom wall of the reservoir.

FIG. 6 is the same view as FIG. 5, showing the float unit of the valve afloat over the water accumulated in the reservoir, the level of water being sufficient to cause the float unit to abut on the stop.

FIG. 7 is the same view as FIG. 5, showing the ballast unit of the valve about to move upwards by buoyancy.

FIG. 8 is the same view as FIG. 5, showing the valve in the raised and open position, thereby allowing the liquid accumulated in the reservoir to be flushed out via the passageway created between the valve and the bottom wall of the reservoir.

FIG. 9 is the same view as FIG. 5, showing the valve back in the down and closed position ready to start a new filling and flushing cycle.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

In the following description, similar features in the drawings have been given similar reference numerals and in order to lighten the figures, some elements are not referred to in some figures if they were already identified in a precedent figure.

Referring to FIGS. 1 to 9, the buoyancy flushing apparatus (10) comprises a reservoir (12) for accumulating liquid (2), having an inlet (14) for receiving liquid, which inlet (14) consists, in this case, of the open top of the reservoir (12), and an outlet chamber (16) recessed in a bottom wall (18) of the reservoir (12).

In order to flush the outlet chamber more rapidly and thereby obtain a more important pulse, the outlet chamber (16) preferably includes more than one outlet (20). This mode of realisation could also be used for flushing liquid in more than one direction. As can be appreciated, the preferred embodiment illustrated comprises four of these outlets (20) evenly distributed around the outlet chamber (16). It is however worth mentioning that the present invention also contemplates using only one outlet.

Figure 2:
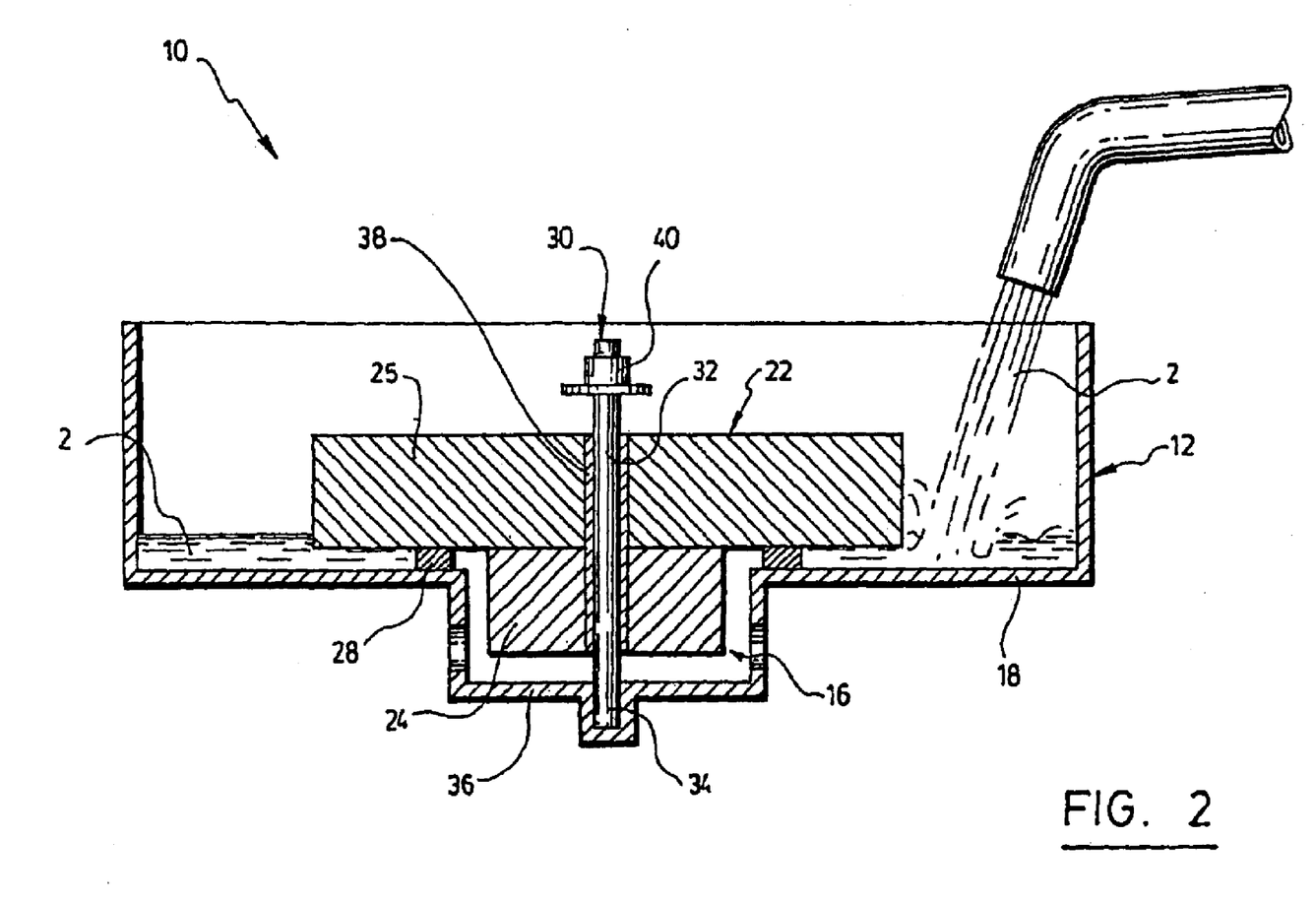
FIGS. 2 to 4 are cross-sectional side views of the flushing apparatus of FIG. 1 showing in sequence the steps occurring in one filling and flushing cycle of the apparatus, FIG. 2 showing the beginning of the cycle where the reservoir is empty, the outlet valve is in the closed position and liquid starts to accumulate in the reservoir.
Figure 3:
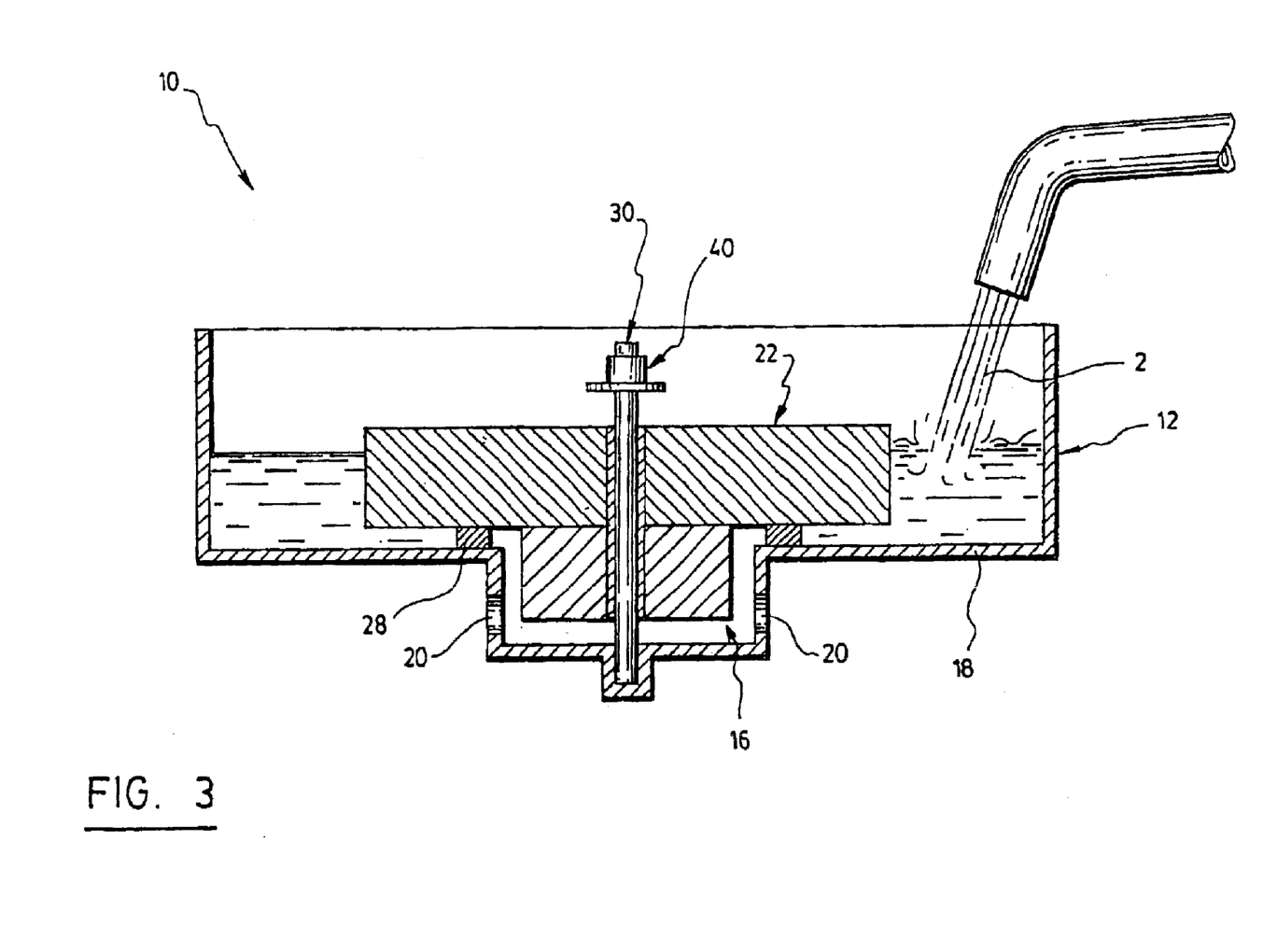
Figure 4:
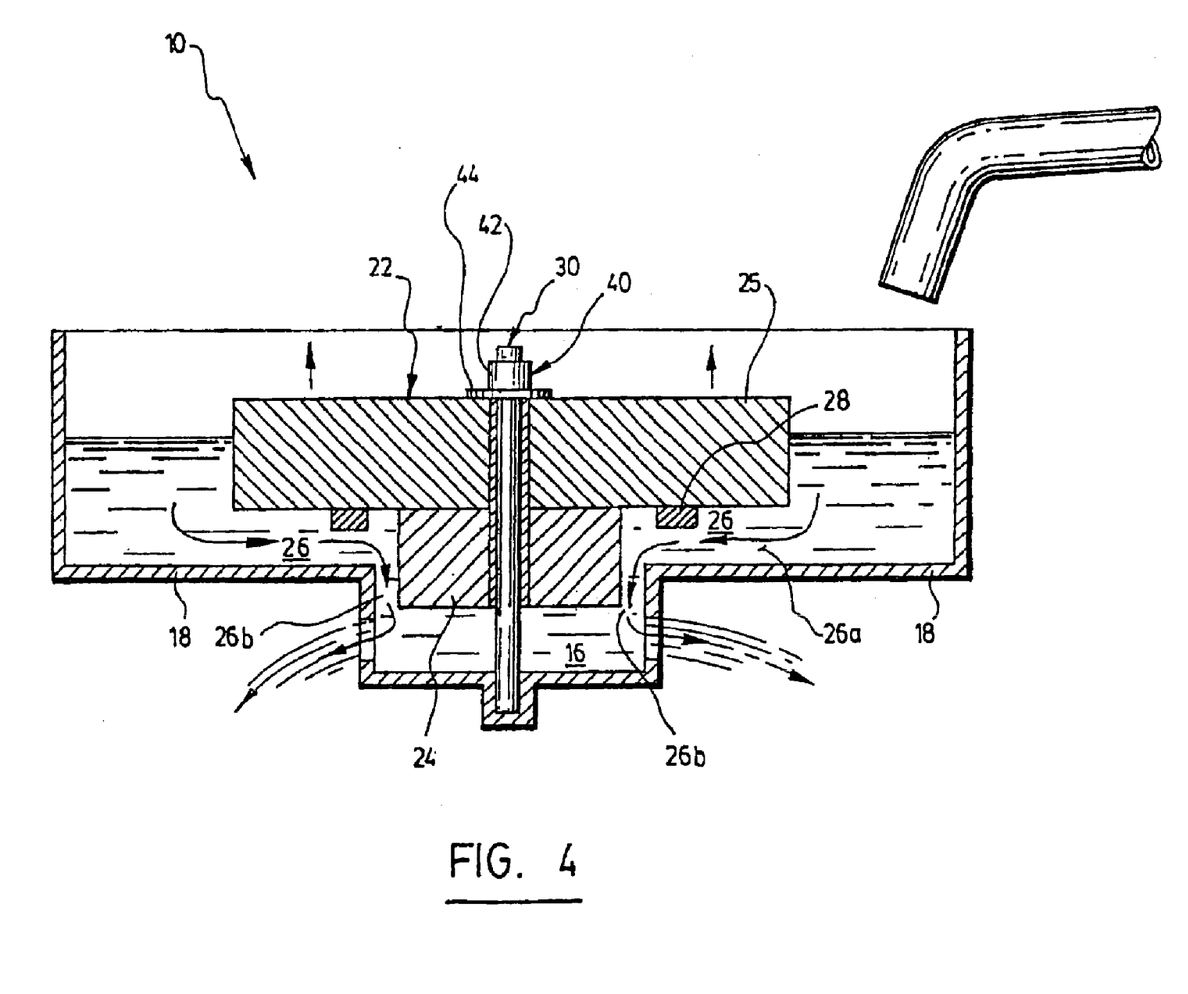
Figure 7:
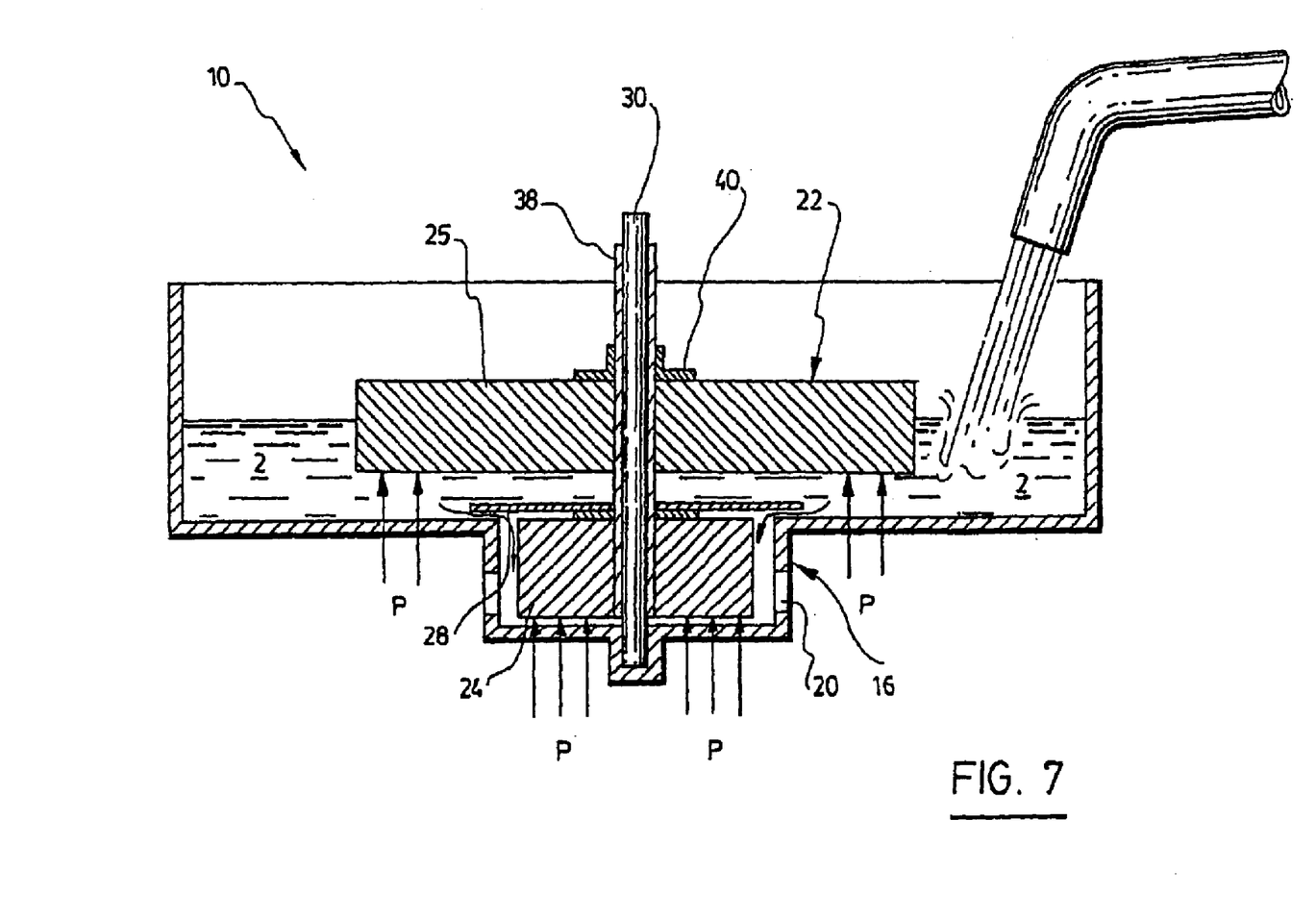
Figure 8:
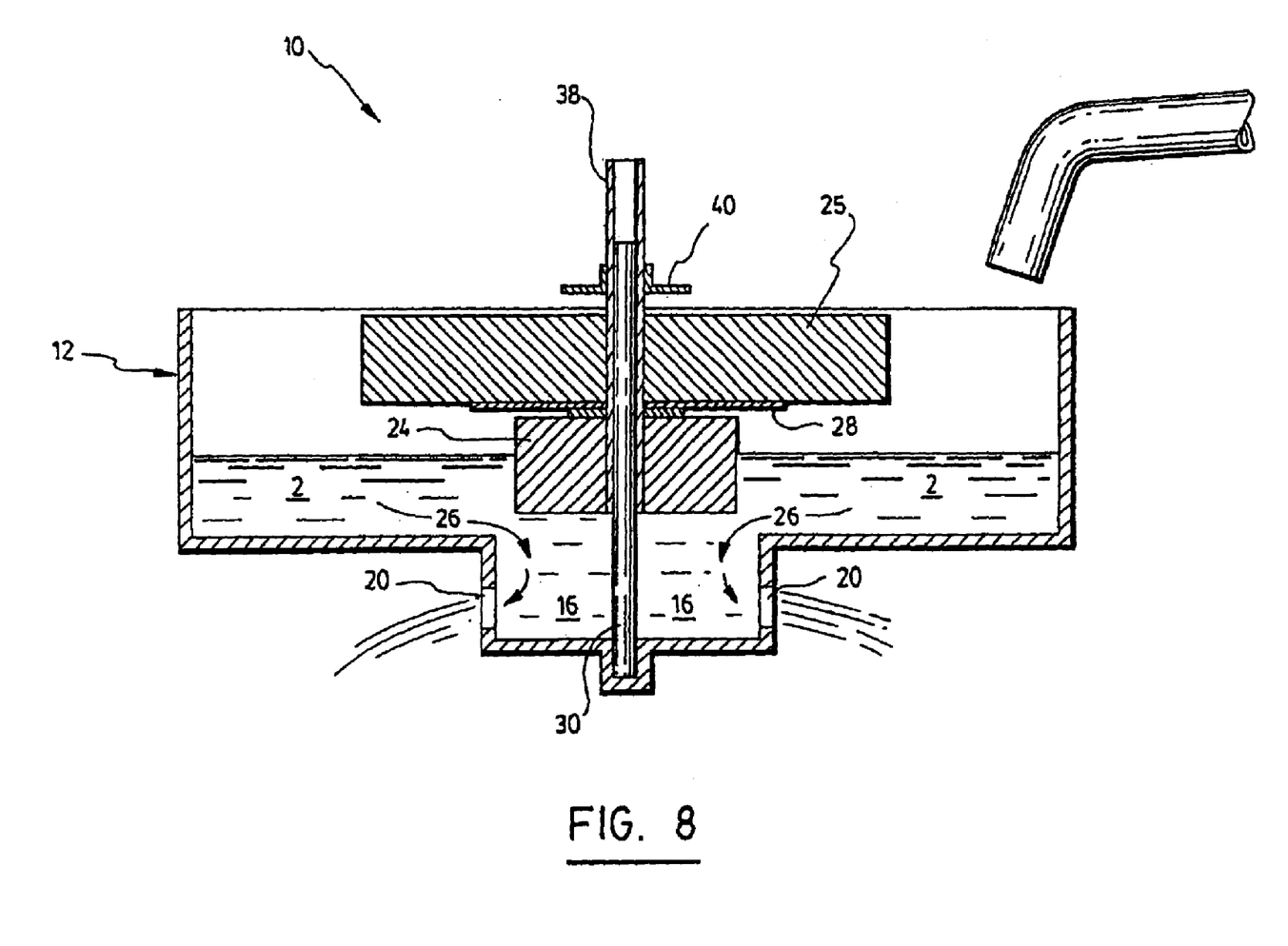
Figure 9:
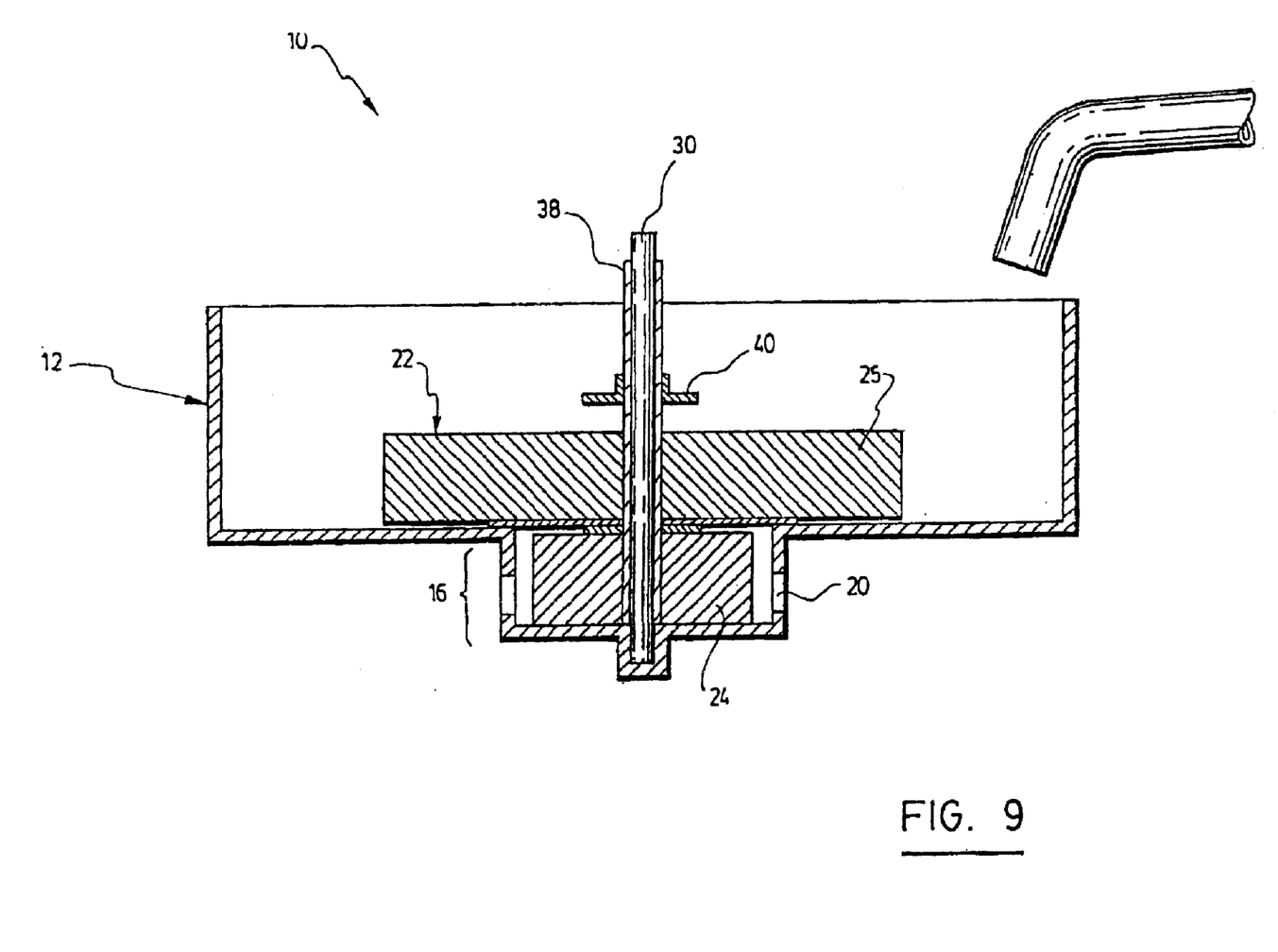

The flushing apparatus (10) further comprises an outlet valve (22) movable between a down and closed position, as in FIG. 2 or 3, and 5 to 7, where liquid (2) accumulates in the reservoir (12), and a raised and open position, as in FIG. 4 and FIG. 8, where liquid (2) accumulated in the reservoir (12) is flushed out via the outlets (20).

The outlet valve (22) comprises a ballast unit (24) and a float unit (25) topping the ballast unit (24). The ballast unit (24) is sized and shaped to fit loosely in the outlet chamber (16) when the valve (22) is in the down position, whereas the float unit (25) is to move the valve (22) in the raised position by buoyancy when a sufficient amount of liquid (2) is accumulated in the reservoir (12), thereby providing a passageway (26), as shown in FIG. 4 and FIG. 8, for liquid (2) between the bottom wall (18) of the reservoir (12) and the valve (22) leading to the outlets (20) in the outlet chamber (16) to flush liquid out of the reservoir (12).

The ballast unit (24) fitting loosely in the outlet chamber (16) means that it does not tightly fit therein, thereby leaving a gap or passage for liquid between the valve (22) and the inside wall of the chamber (16).

As can be appreciated by viewing FIG. 4, the passageway (26) between the valve (22) and the bottom wall (18) of the reservoir (12) divides into a first and second portion (26a, 26b). The first portion (26a) extends underneath the float unit (25) of the valve and leads to the second portion (26b) which extends between the ballast unit (24) of the valve (22) and the inside wall of the outlet chamber (16).

The valve (22) is preferably made of foam or any other suitable floatable material, that is to say a material with a density lower than the density of the liquid, as apparent to any person versed in the art. The float unit (25) could also consist of a hollow enclosed structure made of plastic or any other material that would allow the valve (22) to raise by buoyancy when a certain amount of liquid has been poured in the reservoir (12).

Figure 1:
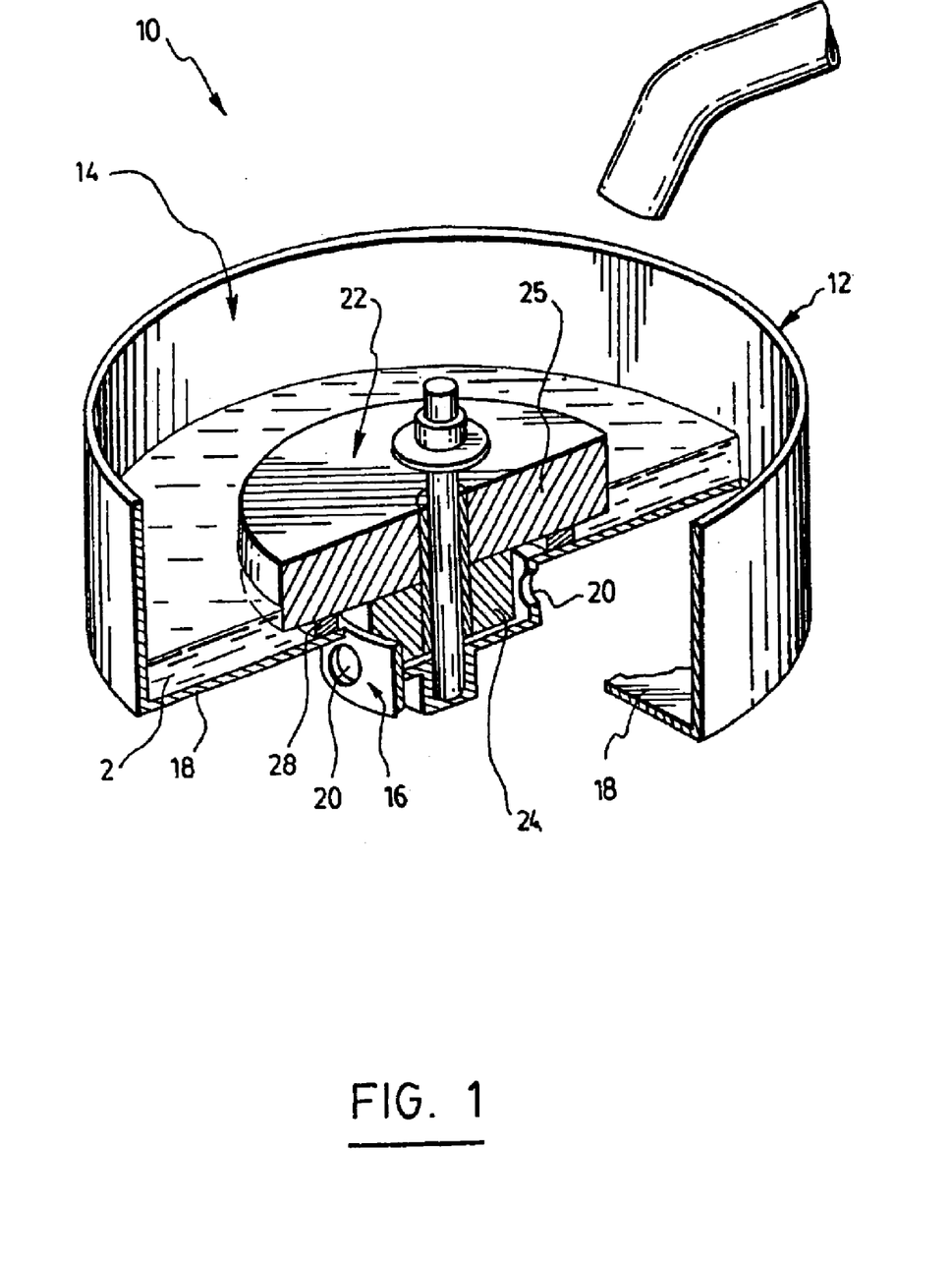
FIG. 1 is a perspective cross-sectional view of a buoyancy flushing apparatus according to a first preferred embodiment of the invention.

As best shown in FIG. 1, the float and ballast units (25, 24) are preferably disc-shaped and concentric, and the float unit (25) has a larger diameter than the ballast unit (24).

These two portions (24, 25) could be integral to each other and made of the same foam material. However, they preferably consist of two individual and separated portions, as clearly shown in the representation of the second preferred embodiment shown in FIGS. 5 to 9. In other words, in operation, they simply abut on one another. In this way, it is easier to select the proper combination of material for the float unit (25) and ballast unit (24). This preferred embodiment allows a better control or an optimization of the apparatus. As for example, it gives more freedom of choice with regards to the material used, or to the dimensions of the float and ballast unit and thus helps to better control the production cost of the apparatus. For example, the float unit (25) could be made of a floatable material, whereas the ballast unit (24) could be made of a more dense material that would provide ballast properties to the ballast unit (24) when the valve (22) is in the down position and the liquid is filling up the reservoir (12). This preferred embodiment also provides a better optimization of the level of water required to trigger the float unit and the ballast unit in the upwards position.

It is however worth mentioning that these two individual portions (24, 25) could be secured to one another, for example by bonding without departing from the scope of the present invention.

It is indeed easy, for a person in the art, to adjust the weight of the float unit with respect to the water level required, or the dimension of the reservoir with respect to the volume of water required.

Details of the First Preferred Embodiment

The outlet valve (22) of the first preferred embodiment shown in FIGS. 1 to 4 further preferably comprises a seal (28) connected to the underside of the float unit (25) of the valve (22) to prevent seepage of liquid between the valve (22) and the bottom wall (18) of the reservoir (12) when the valve (22) is in the down position. The seal (28) could be a rubber washer secured to the underside of the float unit (25) by bonding, screwing or any other type of fastening. The seal is preferably made of neoprene. The seal may further preferably comprise therein a material that prevents bacterial colonization, for example copper, or any polymer known in the art for their negative effects on bacterial growth. It is worth mentioning that, although a valve (22) without such sealing means would not perfectly prevent seepage of fluid when the valve (22) is in the down position, such valve (22) would not depart from the scope of the present invention. It is also worth mentioning that the reservoir or any part of the system that might eventually be in contact with waste water could advantageously be made of a material that prevents bacterial colonization.

Referring to anyone of FIGS. 1 to 4, the flushing apparatus (10) also comprises a guiding means (30) for guiding the outlet valve (22) between the down position and the raised position. The guiding means (30) preferably comprises an upright rod (32) with a lower end (34) secured to the bottom wall of the reservoir (12), more precisely to the bottom wall (36) of the outlet chamber (16). The valve (22) is mounted on the rod (32) in a slidable manner by means of a through hole spanning vertically within the valve (22). Preferably, the guiding means (30) comprises a tubular sleeve (38) that receives the rod (32) and that is fitted in the through hole of the valve (22). The tubular sleeve (38) is made of a rigid material such as rigid plastic or metal, or any other rigid material that stands up to wear. As apparent to any person skilled in the art, the materials of the rod (32) and the sleeve (38) are chosen so as to obtain a good sliding relationship between the sleeve (38) and the rod (32). Optionally, the rod (32) could be coated with a Teflon1 band. The sleeve (38), which helps reducing the friction, also helps preventing early wear of the valve (32).

As best shown in FIG. 4, the guiding means (30) comprises a high stop (40) mounted to the rod (32) for preventing the valve (22) from moving higher than the raised position under the effect of the buoyancy. As can be appreciated from FIG. 4, the velocity of the outflow through the outlets (20) can be adjusted by varying the height of the stop (40) on the rod (32). In this way, it is possible to obtain, if required, an important pulsed hydraulic event. The stop (40) may preferably comprise a ring (42) with a horizontal outer rim (44), slidable on the rod (32), and means such as a conventional fastener for removably securing the ring (42) to the rod (32).

The lower end (34) of the rod (32) is secured to the bottom wall (36) of the chamber (16) either by screwing, welding, bonding or any other way apparent to a person skilled in the art. Advantageously, the outlet chamber (16) may be provided in the bottom wall (36) thereof with a socket (46) to receive the lower end (34) of the rod (32).

Details of the Second Preferred Embodiment

Referring to FIGS. 5 to 9, a second preferred embodiment of the invention is illustrated. In this particular case, the float and ballast units (25, 24) of the valve (22) preferably consist of two separated parts which are interdependent. As can be best appreciated when viewing FIGS. 5 and 6, in this preferred embodiment, the tubular sleeve (38) is slidably mounted on the upright rod (32). Hence, it can move from a lower position as in FIGS. 5 to 7, to a higher position, as in FIG. 8. In this embodiment, the ballast unit (24) of the valve (22) and the high stop (40) are fixed to the tubular sleeve (38), whereas the float unit (25) is slidably mounted thereon. The seal (28) in this case is secured to the sleeve (38). Consequently, when the water accumulating in the reservoir reaches a first level, as in FIG. 6, the float unit (25) moves upwards by buoyancy until it is stopped by the high stop (40). At this stage of the cycle, the valve (22) is still in a closed position, thanks to the ballast unit (24) and to the seal (28) which close the passage towards the outlets (20). Then the water, which continues to accumulate in the reservoir, starts to exercise an increasing upward pressure on the float unit (25). Consequently, the float unit (25) also exercises an upward pressure (P) on the high stop (40), which then causes the seal (28) to slightly lift off when the water accumulating in the reservoir reaches a second level, thereby allowing water to seep there under, as shown in FIG. 7. Then suddenly, the ballast unit (24), which is made of a floatable material, is triggered off and moves upwards to abut on the float unit (25), thereby opening the passage (26) to the outlets (20) widely, as shown in FIG. 8. When the water, which was accumulated in the reservoir (12), has been flushed out, the valve (22) regains its down position, as in FIG. 9, ready to start another cycle.

Figure 10:
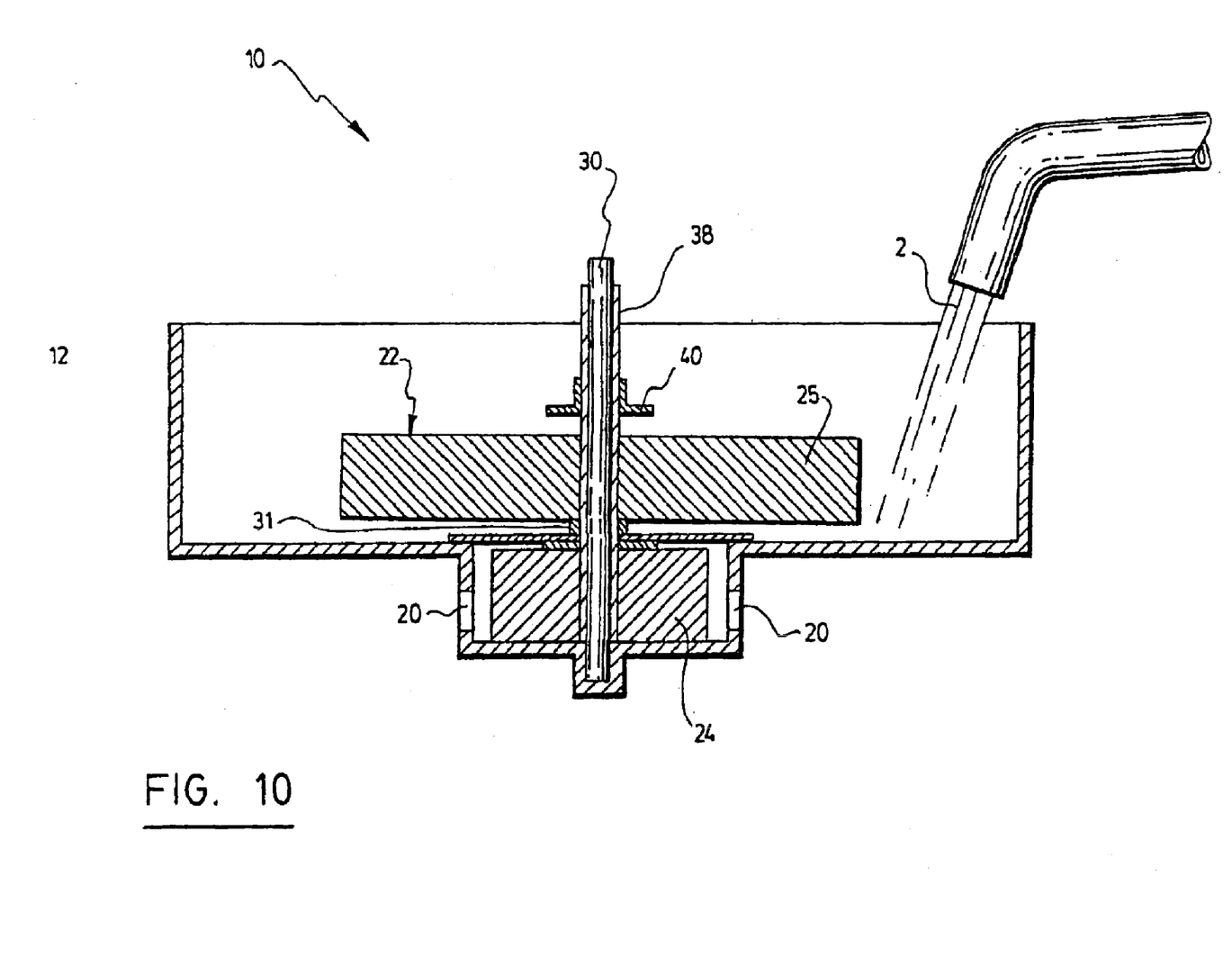
FIG. 10 is a cross-sectional plan view of a buoyancy flushing apparatus according to a third preferred embodiment of the invention which comprises a spacer provided between the seal and the float unit.

In this preferred embodiment, the seal (28) can take the form of a disc-shaped rubber washer secured to the sleeve (38) above the ballast unit (24). The thickness of the seal is preferably chosen so as to provide the seal with a certain rigidity while providing at the same time a certain degree of flexibility. Also preferably, a spacer (29) is provided between the seal and the ballast unit (24) to space the top face of the ballast unit from the underside of the seal. Referring now to FIG. 10, the apparatus may also comprise another spacer between the seal (28) and the float unit (25) to space the top face of the seal (28) from the underside of the float unit (25). As apparent to any person in the art, the tubular sleeve (38) in this preferred embodiment is made of a material sufficiently light so as to allow the ballast unit (24) to move upwards by buoyancy.

The present invention also provides a method for flushing a predetermined amount of liquid, comprising the steps of a) providing a flushing apparatus (10) as defined above and b) accumulating a sufficient amount of liquid (2) in the reservoir (12) to move the valve (22) in the raised position and flush the amount of liquid out of the reservoir (12).

Preferably, the method comprises the step of c) repeating step b) of accumulating after the liquid has been flushed out.

Figure 5:
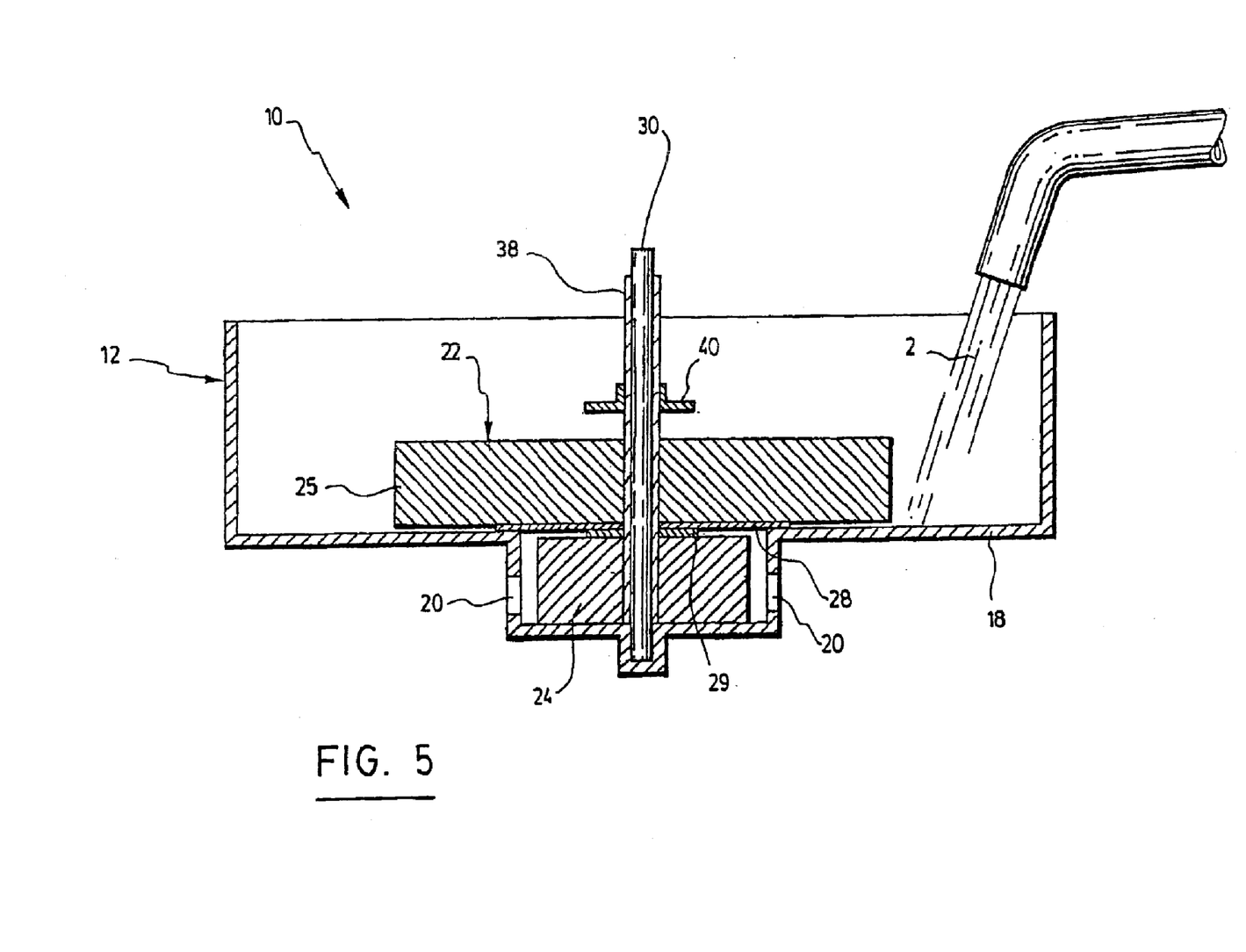
FIGS. 5 to 9 are cross-sectional views of a buoyancy flushing apparatus according to a second preferred embodiment of the invention, showing in sequence the steps occurring in one filling and flushing cycle of the apparatus, FIG. 5 showing the outlet valve in the down and closed position at the point where water starts to fill the reservoir.
Figure 6:
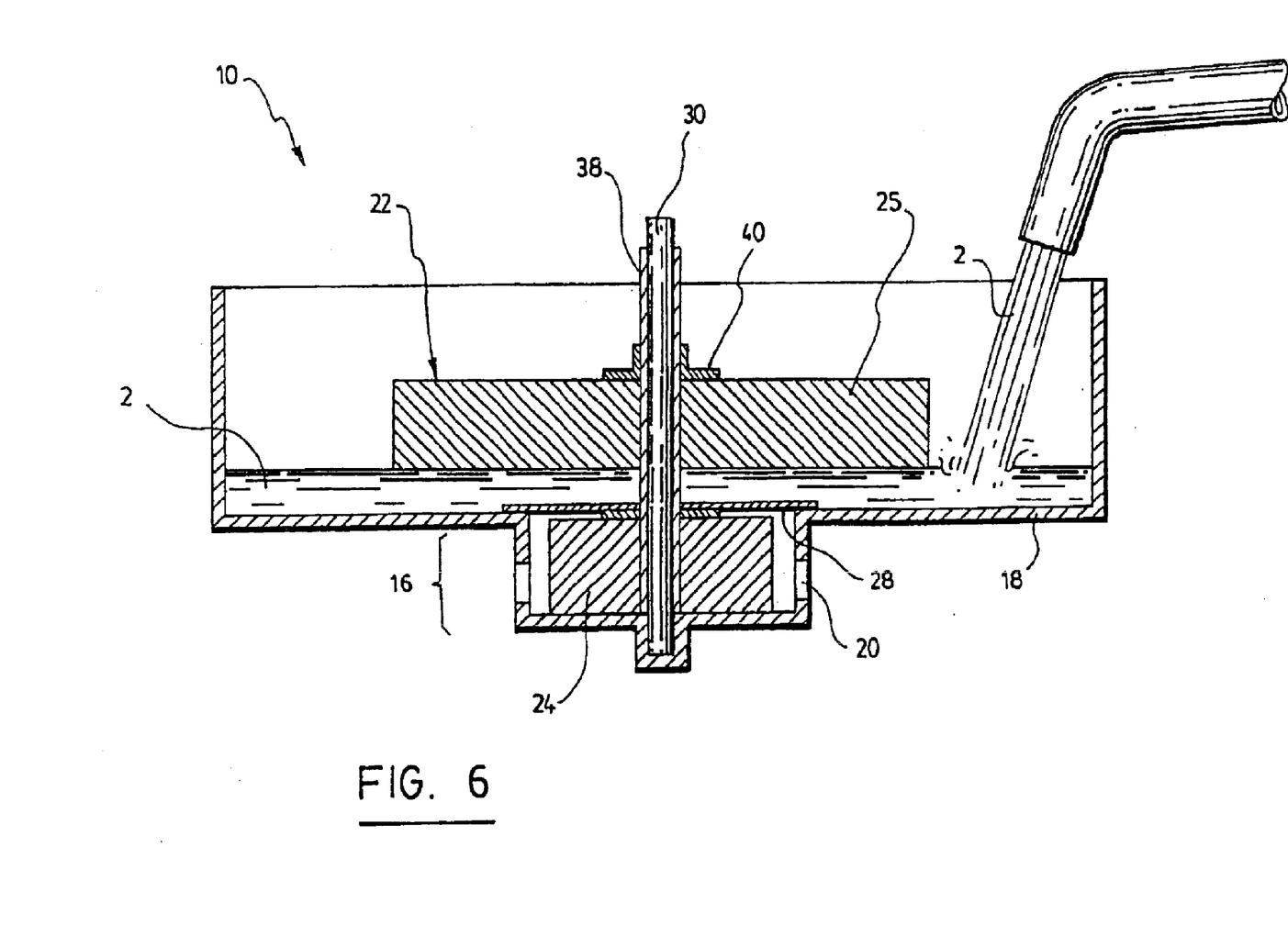

The operation of the flushing apparatus (10) is illustrated with respect to FIGS. 2 to 4 in sequence or FIGS. 5 to 9 in sequence. In FIG. 2 or 5, it can be seen that, at first, when no liquid (2) is accumulated in the reservoir (12), the valve (22) is maintained in a down position by gravity, thereby obstructing the outlet chamber (16). Then, as the liquid (2) accumulates in the reservoir (12), the gravity effect is gradually counterbalanced by the buoyancy of the valve (22). As shown in FIG. 4 or 8, as the buoyancy force exceeds the gravity effect, the valve (22) raises, thereby providing a passageway (26) for liquid which discharges through the outlets (20) of the outlet chamber (16). While the liquid flows in the passageway (26), it also exerts an upward pressure on the valve (22), thereby further helping the same to remain in the raised position. When the reservoir (12) has been emptied, the valve (22) goes down to repeat another cycle.

The apparatus of the present invention can be very useful in the field of septic systems, or other water treatment units, as it allows an easy dosing of the effluent from a septic tank into an absorption field. It could also be very useful in any other systems operated in places where the difference in level is low, as in irrigation systems.

It is well known in the field of septic systems that, because the rate of flow of liquid into the septic tank is relatively slow, on the order of less than about one to five liter per minute, the effluent is not effectively distributed throughout the absorption field or drain field. The experience has shown that, as a result of this poor distribution of the effluent, the absorption field has, in the beginning, a low treatment efficiency, which ultimately causes the absorption field to progressively clog. By accumulating the water coming from a septic tank before it is flushed out in the absorption field, the flushing apparatus of the present apparatus provides a pulsed feeding that helps reducing the clogging effect commonly occurring in absorption fields. The flushing apparatus also has the advantage of not requiring an important variation of the water level in order to obtain a pressure head sufficient to create the required hydraulic event at the outlets (20) of the apparatus (10). In other words, the pressure head created by the water accumulated in the reservoir (12) is more important than the variation of the water level necessary to create such pressure head. Therefore, in order to obtain an outflow comparable to the outflow obtained with a prior art buoyancy flushing apparatus of the type described, for example, in U.S. Pat. No. 5,290,434, the reservoir (12) of the present invention does not have to be as deep as the tank described in that prior art U.S. patent.

Furthermore, the preferred embodiments described above, which comprise a plurality of outlets, also have the advantage of providing a liquid distribution system that shows little variations between the flows of liquid flowing out from the different outlets (20) of the apparatus (10). Indeed, experimentation conducted by the applicant has proven that these variations are generally less than 10%, and even less than 5% in certain cases. Furthermore, testing conducted with wastewater shows that there is substantially no clogging up of the outlets (20) with the passing of time, since these outlets (20) are regularly washed up by the liquid flowing out of the reservoir (12) at a relatively high velocity. Indeed, the results obtained with wastewater show that the variations mentioned above remain steady with the passing of time.

Results of Testing Conducted on a Flushing Apparatus, as Shown in FIG. 5, Which was Fed with Residential Wastewater The results obtained with respect to the distribution of the flow rate between each outlet are reported in the following Table I:

TABLE I

| Duration of the test (in days) | Number of outlets | Maximum deviation from the mean flow rate (%) | |
|---|---|---|---|
| 1 | 4 | −7.0 | 4.2 |
| 97 | 4 | −5.5 | 3.0 |
|  | 6 | −4.8 | 4.4 |
| 144 | 4 | −3.6 | 3.1 |
| 240 | 4 | −2.1 | 1.7 |
| 462 | 4 | −6.5 | 4.3 |

The applicant also tested the effect of the variation of the inclination of the apparatus on the distribution of the flow rate between each outlet. The results of these tests are reported in the following Table II.

TABLE II

| Inclination (%) | Maximum deviation from the mean flow rate (%) | |
|---|---|---|
|  | 4 outlets | 6 outlets |
| 0.7 | 1.7 | 4.2 |
| 1.4 | 1.4 | 5.9 |
| 2.0 | 2.4 | 7.0 |
| 3.3 | 4.4 | 7.4 |
| 4.7 | 5.0 | 9.0 |

As can be appreciated, these results show that the inclination of the apparatus with respect to the horizontal has a minor effect on the flow rates. Indeed, the experiments conducted by the applicant show that, for each outlet, the maximum deviation from the mean flow rate is generally less that 10% m and even less than 5% in certain cases.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

What is claimed is:

1. A buoyancy flushing apparatus comprising:
   a reservoir for accumulating liquid, having:
      an inlet for receiving liquid;
      an outlet chamber recessed in a bottom wall of the reservoir; the outlet chamber including an outlet for draining liquid out of the reservoir;
   an outlet valve movable between a down position where liquid accumulates in the reservoir and a raised position where liquid accumulated in the reservoir is flushed out via the outlet, the outlet valve comprising:
      a ballast unit sized and shaped to fit loosely in the outlet chamber when said valve is in the down position;
      a float unit topping the ballast unit to move said valve in the raised position by buoyancy when a sufficient amount of liquid is accumulated in the reservoir, thereby providing a passageway for liquid at least partially defined by an outer wall of the float unit, an outer wall of the ballast and the bottom wall of the reservoir the passageway leading to the outlet in the outlet chamber to flush liquid out of the reservoir,
   a guiding means for guiding the outlet valve between the down position and the raised position; and
   a seal to completely close the outlet chamber when the valve is in the down position.

2. A buoyancy flushing apparatus as claimed in claim 1, comprising more than one of said outlets provided in the outlet chamber.

3. A buoyancy flushing apparatus as claimed in claim 1, wherein the ballast and float units are made of foam.

4. A buoyancy flushing apparatus as claimed in claim 1, wherein the ballast and float units of the outlet valve consist of two separated individual units.

5. A buoyancy flushing apparatus as claimed in claim 4, wherein the ballast and float units are made of materials with different densities.

6. A buoyancy flushing apparatus as claimed in claim 1, wherein the ballast and float units are both disc-shaped, the float unit having a larger diameter than the ballast unit.

7. A buoyancy flushing apparatus as claimed in claim 4, wherein the guiding means comprises an upright rod with a lower end connected to a bottom wall of the outlet chamber, the ballast unit and float unit of the outlet valve being mounted on said rod in a slidable manner.

8. A buoyancy flushing apparatus as claimed in claim 7, wherein the guiding means comprises:
   a sleeve slidably mounted on the upright rod, the ballast unit being fixed to the sleeve, whereas the float unit is slidably mounted on the sleeve;
   a high stop secured to the sleeve above the floating unit for stopping an upward movement of the float unit when the float unit is caused to move upwards by buoyancy; and wherein
   the seal is secured to the sleeve on top of the ballast unit; whereby, when the liquid accumulating in the reservoir reaches a first level, the float unit moves upwards by buoyancy until it is stopped by the high stop leaving the ballast unit in the outlet chamber which is closed by the seal, then when the liquid continues to accumulate in the reservoir, an increasing upward pressure starts to exercise on the float unit and the high stop, thereby causing the seal to slightly lift off and allowing liquid to seep there under and causing the ballast unit to trigger off and move upwards to abut on the float unit, thereby opening widely the passageway to the outlet.

9. A buoyancy flushing apparatus as claimed in claim 1, wherein the passageway comprises a first portion extending underneath the float unit of the valve and leading to a second portion extending between the ballast unit of the valve and an inner side wall of the outlet chamber.

10. A buoyancy flushing apparatus as claimed in claim 8, wherein the seal comprises therein a material that prevents bacterial colonization.

11. A buoyancy flushing apparatus as claimed in claim 10, wherein said material is copper.

12. A buoyancy flushing apparatus as claimed in claim 8, wherein the seal is disc-shaped.

13. A buoyancy flushing apparatus as claimed in claim 12, wherein the seal is made of neoprene.

14. A method for flushing a predetermined amount of liquid, comprising the steps of:

a) providing a flushing apparatus as defined in claim 1; and b) accumulating a sufficient amount of liquid in the reservoir to move the outlet valve in the raised position and flush said amount of liquid out of the reservoir.

15. A method as claimed in claim 14, comprising the step of:

c) repeating step b) after the liquid has been flushed out.

* * * * *